United States Patent [19]

Shimizu

[11] Patent Number: 5,668,937
[45] Date of Patent: Sep. 16, 1997

[54] OUTPUT METHOD AND APPARATUS

[75] Inventor: Masaaki Shimizu, Sagamihara, Japan

[73] Assignee: Canon Kabushiki Kaisha, Tokyo, Japan

[21] Appl. No.: 476,046

[22] Filed: Jun. 7, 1995

Related U.S. Application Data

[63] Continuation of Ser. No. 281,116, Jul. 27, 1994, abandoned, which is a continuation of Ser. No. 218,457, Mar. 28, 1994, abandoned, which is a continuation of Ser. No. 868,124, Apr. 14, 1992, abandoned.

[30] Foreign Application Priority Data

Apr. 23, 1991 [JP] Japan .................. 3-092309

[51] Int. Cl.$^6$ .................. G06K 15/00
[52] U.S. Cl. .................. 395/115
[58] Field of Search .................. 395/101, 112, 395/114, 115, 116, 507, 508, 509, 510; 358/404, 444, 538, 540, 467; 345/113–115

[56] References Cited

U.S. PATENT DOCUMENTS

| | | | |
|---|---|---|---|
| 4,277,835 | 7/1981 | Garziera et al. | 395/114 |
| 4,568,983 | 2/1986 | Bobick | 358/260 |
| 4,881,180 | 11/1989 | Nishiyama | 395/114 |
| 4,941,108 | 7/1990 | Aoyagi et al. | 395/115 |
| 5,047,955 | 9/1991 | Shope et al. | 395/114 |
| 5,129,049 | 7/1992 | Cuzzo et al. | 395/112 |

FOREIGN PATENT DOCUMENTS

| | | |
|---|---|---|
| 378316 | 7/1990 | European Pat. Off. |
| 474153 | 3/1992 | European Pat. Off. |
| 510923 | 10/1992 | European Pat. Off. |

*Primary Examiner*—Arthur G. Evans
*Attorney, Agent, or Firm*—Fitzpatrick, Cella, Harper & Scinto

[57] ABSTRACT

An output apparatus such as a printer comprises: a presumed time calculator to calculate a time which is needed to develop code data into output data corresponding to each segment among a plurality of segments constructing one and a determining circuit to determine whether the output data of the segment should previously be developed into a bit map image and stored or not on the basis of the presumed time and a time required to generate one page irrespective of the output data. The time required to generate one page relates to the paper feed speed.

36 Claims, 12 Drawing Sheets

OUTPUT METHOD AND APPARATUS

This application is a continuation of application Ser. No. 08/281,116 filed Jul. 27, 1994, now abandoned, which was a continuation of application Ser. No. 08/218,457 filed Mar. 28, 1994, now abandoned, which was a continuation of application Ser. No. 07/868,124 filed Apr. 14, 1992, now abandoned.

BACKGROUND OF THE INVENTION

1. Field of the Invention

The invention relates to an output apparatus in which data constructing a page is received from a host computer, a character code or graphic data transmitted from the host computer is developed into a bit map, image data transmitted from the host computer is developed, or an external character font or logo is developed, thereby forming bit map information as output information and generating the same.

2. Related Background Art

Hitherto, such a kind of output apparatus, for instance, a printing apparatus such as a laser beam printer or the like comprises:

1. a controller section for receiving and processing print data from a host computer, for converting the print data into a video signal, and for transmitting the video signal to a printer mechanism section (printer engine); and
2. a printer mechanism section (printer engine) for forming a visible image onto a paper (ordinary paper) by using an electrophotographic process on the basis of the video signal transmitted from the controller section.

In general, the controller section develops the print information of one page into an image memory as a bit map in accordance with the performance of the printer engine on the basis of the print data (character code, figure, image, print position, size designation, etc.) received from the host computer. The bit map image in the image memory is converted into the video signal and the video signal is transferred to the printer engine, thereby obtaining a print output.

Meanwhile, the printer engine makes a paper feed system in the printer engine operative on the basis of control information from the controller section and also forms an image onto a photo sensitive drum by a photo sensitive agent such as a toner or the like on the basis of the video signal transmitted from the controller section by using a light emitting device such as laser beam, LED array, liquid crystal shutter, or the like and transfers the formed image onto a paper (ordinary paper) fed by a paper feed. A stable print result is obtained from the visible image transferred onto the paper (ordinary paper) by using a fixing device of a high temperature and a high voltage.

In the printer as mentioned above, in the case where the controller section develops the print data transmitted from the host computer into a bit map, the print data is ordinarily developed in accordance with the performance (resolution, binary/multilevel value, monochrome/color, etc.) of the printer engine.

However, as the performance of the printer engine is improved, a memory capacity which is required for the controller to develop one page of bit map image increases.

It has been considered to avoid the needed increase in memory capacity by a method (band control) whereby the print data of one page is divided into a plurality of portions (segment units) and at least two memory areas into which the divided print data can be developed are prepared, the print data is sequentially developed on a segment unit basis synchronously with a paper feed speed of the printer engine, and the print data is transferred to the printer engine.

However, in general, after the paper feed has been started, the conveyance of the paper cannot be temporarily stopped during the conveyance of the paper.

Therefore, if the print data development time of a certain segment is longer than the paper feed time, there is a problem in that the correct print result is not obtained (overrun).

SUMMARY OF THE INVENTION

In consideration of the problem of the occurrence of the overrun in the band control mentioned above, it is an object of the invention to provide output method and apparatus in which a development time to develop a bit map image is previously predicted for print data on a segment unit basis, and when the predicted development time is longer than a paper feed time, the print data of the relevant segment is preliminarily developed and stored, thereby enabling the correct print result to be always obtained without causing an overrun in the band control.

DETAILED DESCRIPTION OF THE PREFERRED EMBODIMENTS

An embodiment of the invention will be described hereinbelow with reference to the drawings. However, the invention is not limited to only the embodiment but the invention can be also accomplished by an apparatus or a system comprising a plurality of apparatuses. The invention can be also obviously applied to the case of accomplishing the invention by supplying a program to an apparatus or a system.

Figure 1:
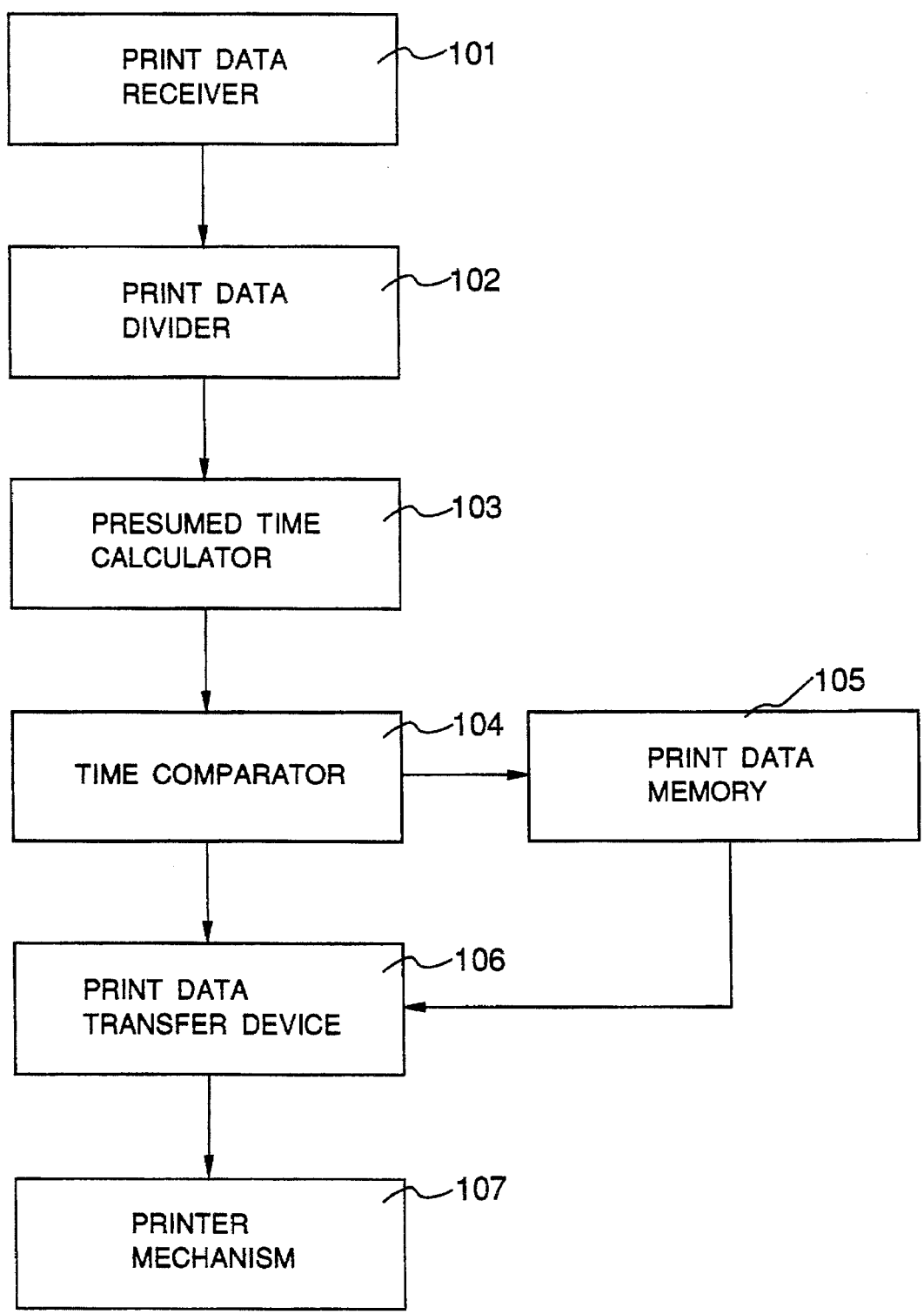
FIG. 1 is a block diagram showing a schematic function construction of a printer according to the invention.

FIG. 1 is a schematic block diagram showing a functional construction of a printer according to the invention.

In FIG. 1, reference numeral 101 denotes a print data receiver to receive print data transmitted from a host computer.

The print data comprises: data such as character code, figure, image or the like to be actually printed; print data to designate the print position, size, etc.; and control data for the printer mechanism section (printer engine). The control data denotes control data such as to designate a switching control of a paper feed mode (cassette paper feed, and inserting paper feed).

Reference numeral 102 denotes print data divider for taking out the print data of one page from the print data received by the print data receiver 101 and for further dividing the print data on a segment unit basis.

Reference numeral 103 denotes a presumed time calculator for calculating the developing time which is required when each of the print data divided by the print data divider 102 is developed into a bit map image.

Reference numeral 104 denotes a time comparator to compare the presumed time calculated by the calculator 103 and a paper feed time which is required to feed the paper by a distance of the image data of one segment. Reference numeral 105 denotes a print data memory for developing the print data of the relevant segment into the bit map image and for storing when the presumed time is longer than the paper feed time as a result of the comparison by the comparator.

Reference numeral 106 denotes a print data transfer device for developing the print data into the bit map image on a segment unit basis and for transferring to the printer mechanism. The transfer device 106 also transfers the bit map image developed and stored in the memory 105 to the printer mechanism on a segment unit basis.

Reference numeral 107 denotes a printer mechanism to actually execute a printing process.

Figure 2:
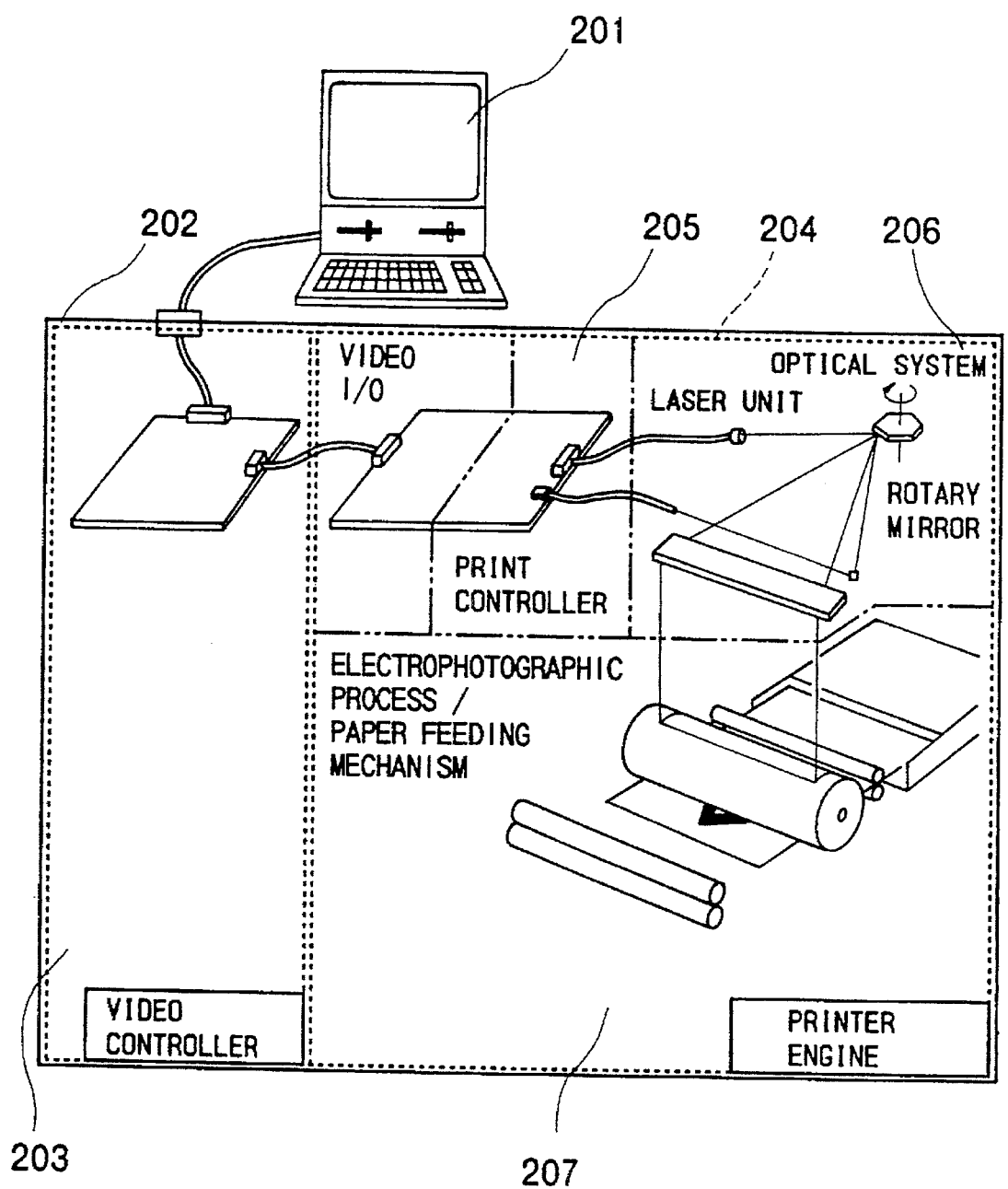
FIG. 2 is a conceptual diagram showing a general construction of the printer.
Figure 3:
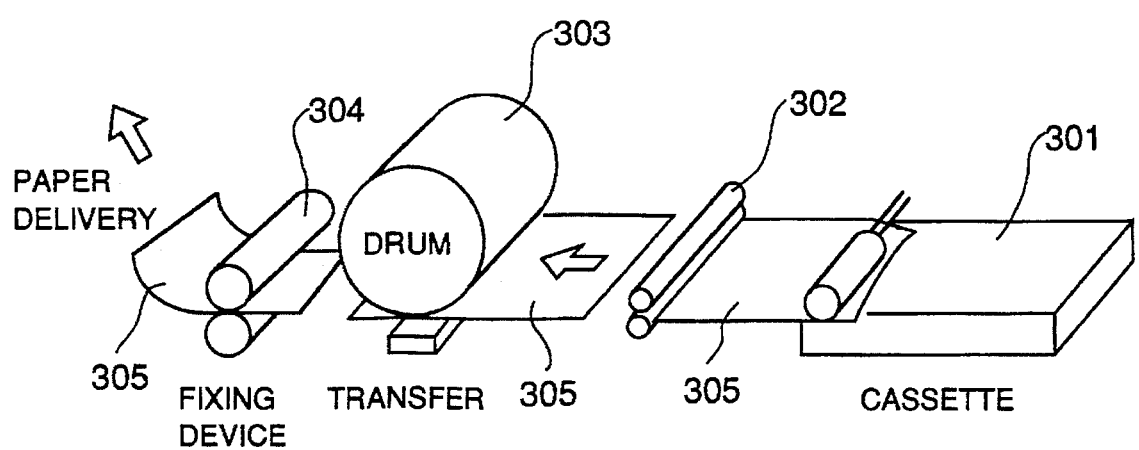
FIG. 3 is a conceptual diagram showing a paper feed system 207 in FIG. 2.

FIGS. 2 and 3 show a general construction of the printer.

Reference numeral 201 in FIG. 2 denotes a host computer to transmit various kinds of print data to the printer.

As an actual printer mechanism, there is used a printer using an electrophotographic process which is constructed in the following manner. Bit map information based on a page unit is converted into the video signal and transferred to the printer mechanism from the print data transfer device. The printer mechanism forms an image corresponding to the bit map information based on the page unit onto a photosensitive drum by a photosensitive agent such as a toner or the like synchronously with the video signal by using a light emitting device such as laser beam, LED array, LCD shutter, or the like. The image formed on the drum is transferred onto a paper (ordinary paper). The visible image transferred onto the paper (ordinary paper) is generated as a stable print result by using a fixing device of a high temperature and a high pressure.

In FIG. 2, reference numeral 202 denotes an example of a printer according to the invention (in this example, there is shown a laser beam printer using a laser beam as a light emitting device). Reference numeral 203 denotes a controller section of the printer and 204 indicates a printer mechanism (printer engine) of the printer.

Reference numeral 205 in FIG. 2 denotes a print controller to control the whole printer mechanism 204 in FIG. 2. The print controller 205 comprises: a section for receiving the video signal from the controller section 203, for receiving a control command from the controller section, and for transmitting a status of the engine to the controller section; and a section to control the electrophotographic process, the paper feed system, and the optical system.

Reference numeral 206 in FIG. 2 denotes an optical system in the printer engine 204 in FIG. 2.

Reference numeral 207 in FIG. 2 indicates an electrophotographic process (image formation) and a paper feed system in the printer engine 204 in FIG. 2. FIG. 3 is a diagram showing the paper feed system 207 in FIG. 2.

In FIG. 3, reference numeral 301 denotes a paper feed cassette and 302 indicates a paper feed roller to feed the paper from the paper feed cassette.

Reference numeral 303 denotes a photo sensitive drum and 304 indicates a fixing device.

Reference numeral 305 denotes a conveying state of the paper in the paper feed system.

Figure 4:
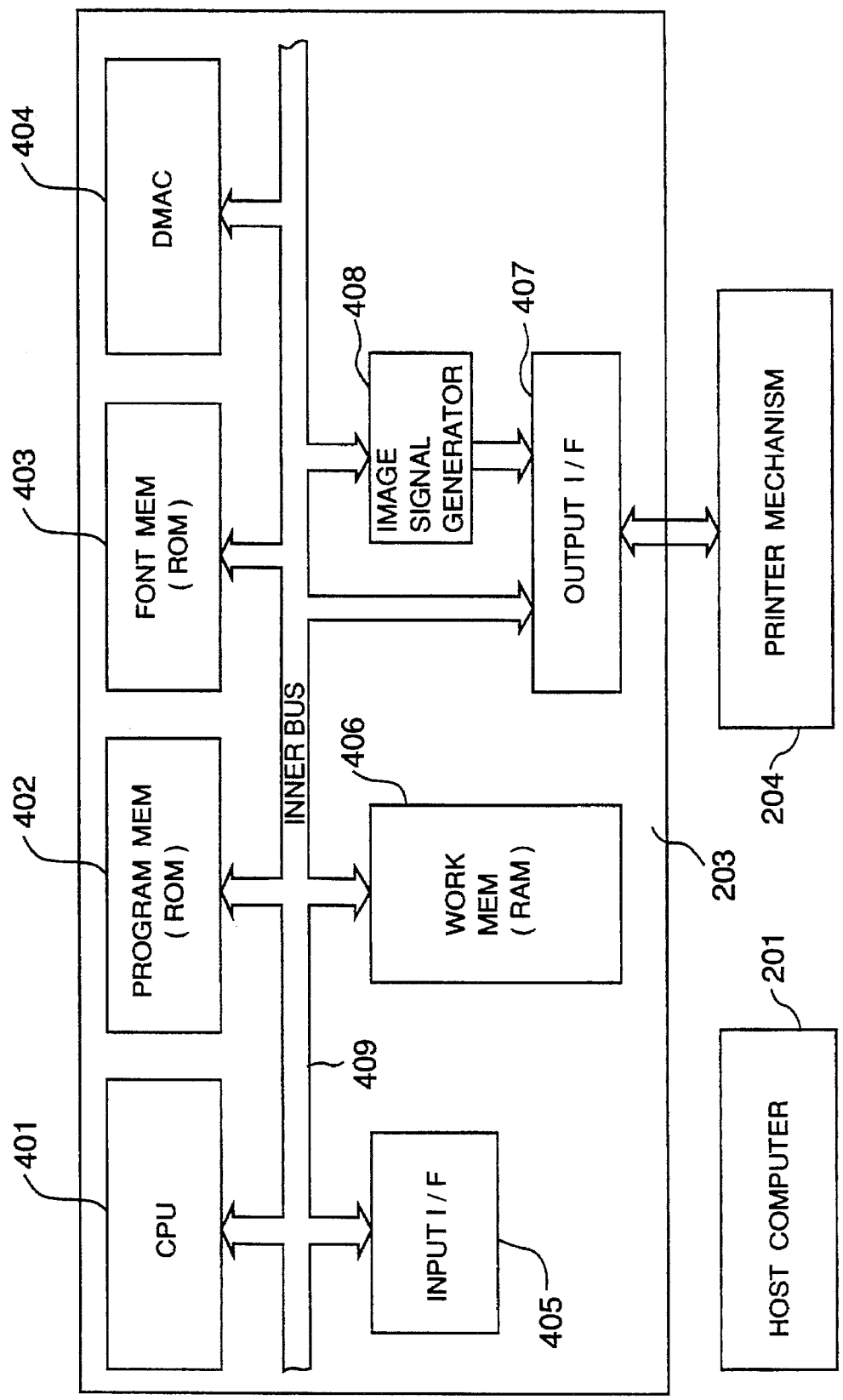
FIG. 4 is a block diagram of a controller section 203 in FIG. 2.

FIG. 4 shows a block diagram of the controller section 203 in FIG. 2.

In FIG. 4, reference numeral 401 denotes a central processing unit (CPU) to control the whole controller and 402 indicates a program memory in which a program to control the controller section is stored. The program memory 402 is constructed by, for example, a ROM (read only memory). Reference numeral 403 denotes a font memory in which font information to develop a character code into a bit map is stored and which is constructed by, for instance, a ROM and 404 indicates a hardware circuit to transfer the bit map image obtained by developing the print data to the printer engine. The hardware circuit 404 is constructed by, for instance, a DMAC (direct memory access controller) or a FIFO. Reference numeral 405 denotes a data input interface circuit to connect the host computer (201 in FIG. 4) and the controller section (203 in FIG. 4). Reference numeral 406 indicates a work memory which is necessary to make the program in the program memory 402 operative and which is constructed by, for example, a RAM (random access memory). A storage area for the print data, a storage area for the development data based on the segment unit by the memory 105 in FIG. 1, a print data development area for the transfer device 106 in FIG. 1, and the like are also provided in the work memory 406. Reference numeral 407 denotes a data output interface circuit to connect the controller section (203 in FIG. 4) and the printer engine (204 in FIG. 4). Reference numeral 408 denotes an image signal generator to generate the video signal from the image memory (406) synchronously with the printer engine (204) and 409 indicates an inner bus to connect each memory, the circuit, and the CPU.

The concept of the invention will now be described with reference to FIGS. 5 to 7 in accordance with flowcharts of FIGS. 8 to 10.

Figure 8:
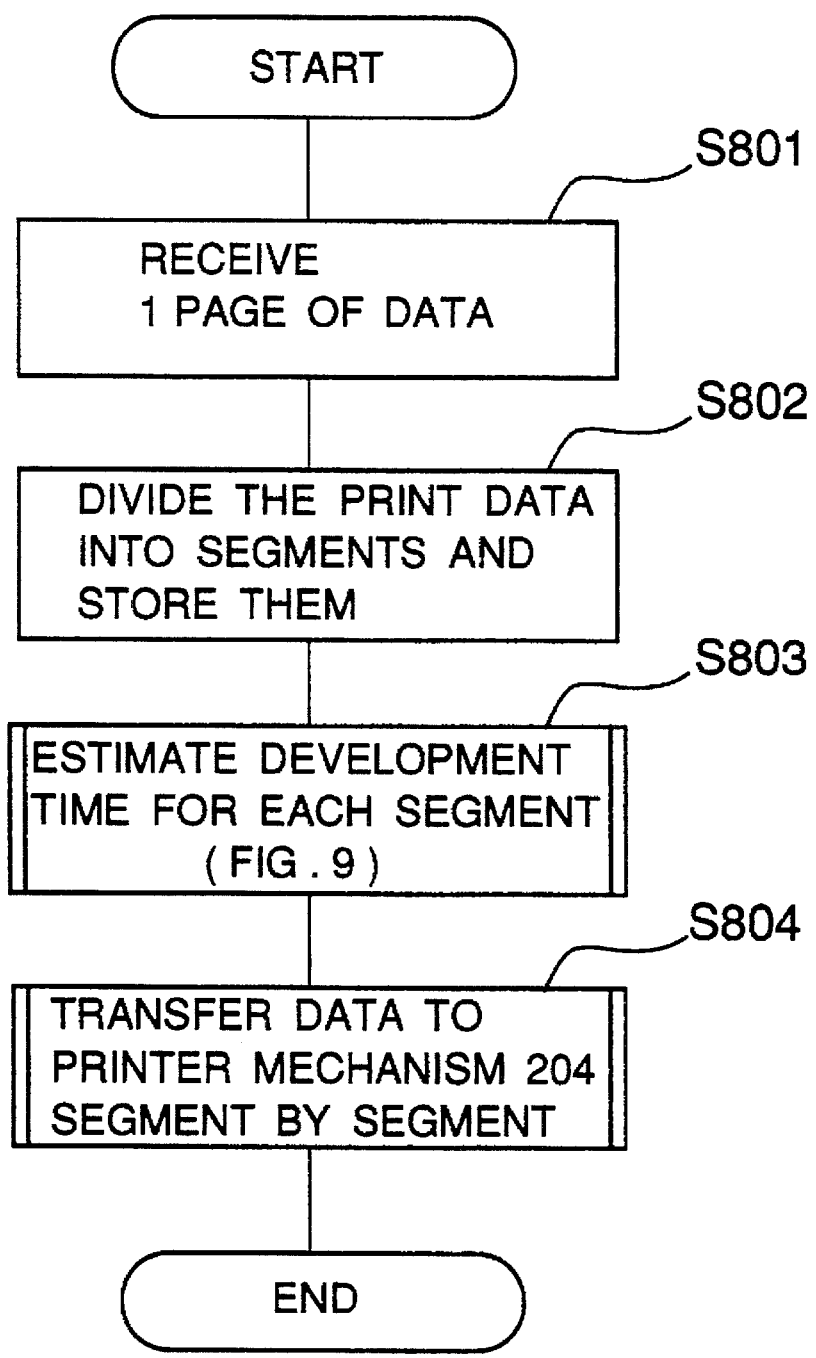
FIG. 8 is a flowchart showing the band control method according to the embodiment.

The flowchart of FIG. 8 shows a printing process of one page which is executed by the printer at a time point when the print data of one page is transmitted from the host computer.

First, the print data of one page is received (step S801 in FIG. 8). The received print data is divided into segments and stored (step S802).

Figure 5:
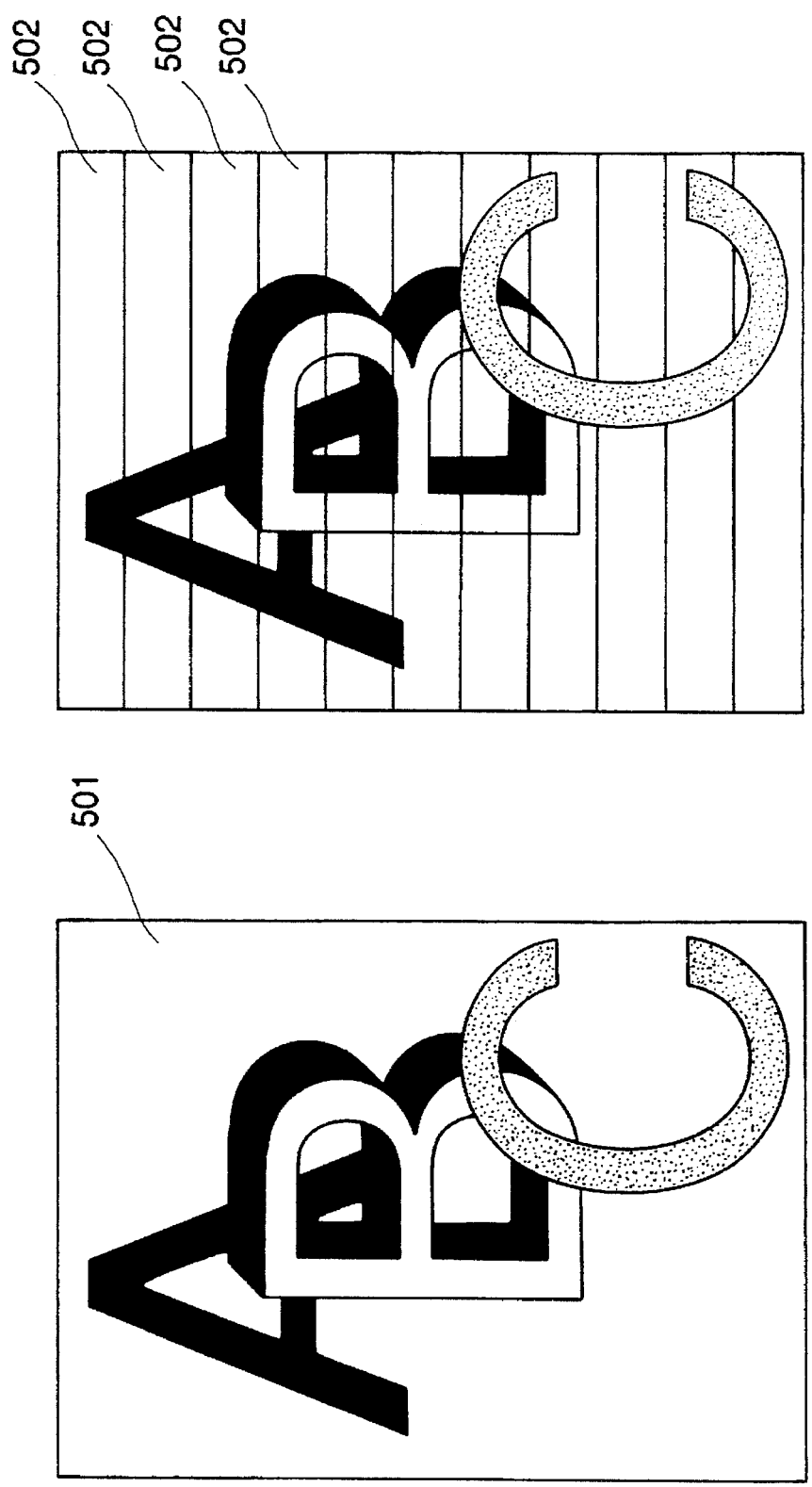
FIG. 5 is a diagram showing the relation between the print data and the segment.

That is, print data of one page as shown by reference numeral 501 in FIG. 5 is divided on a segment unit basis as shown by reference numeral 502 in FIG. 5 and stored.

A presumed developing time of each segment unit is subsequently presumed and the print data based on the segment unit is developed and stored as necessary (step S803). The detailed processing steps in this case are shown in the flowchart of FIG. 9.

The data based on the segment unit is subsequently transferred to the printer engine (S804). The detailed processing steps in this case are shown in the flowchart of FIG. 10.

The details of steps S803 in FIG. 8 will now be described in accordance with the flowchart of FIG. 9.

Figure 9:
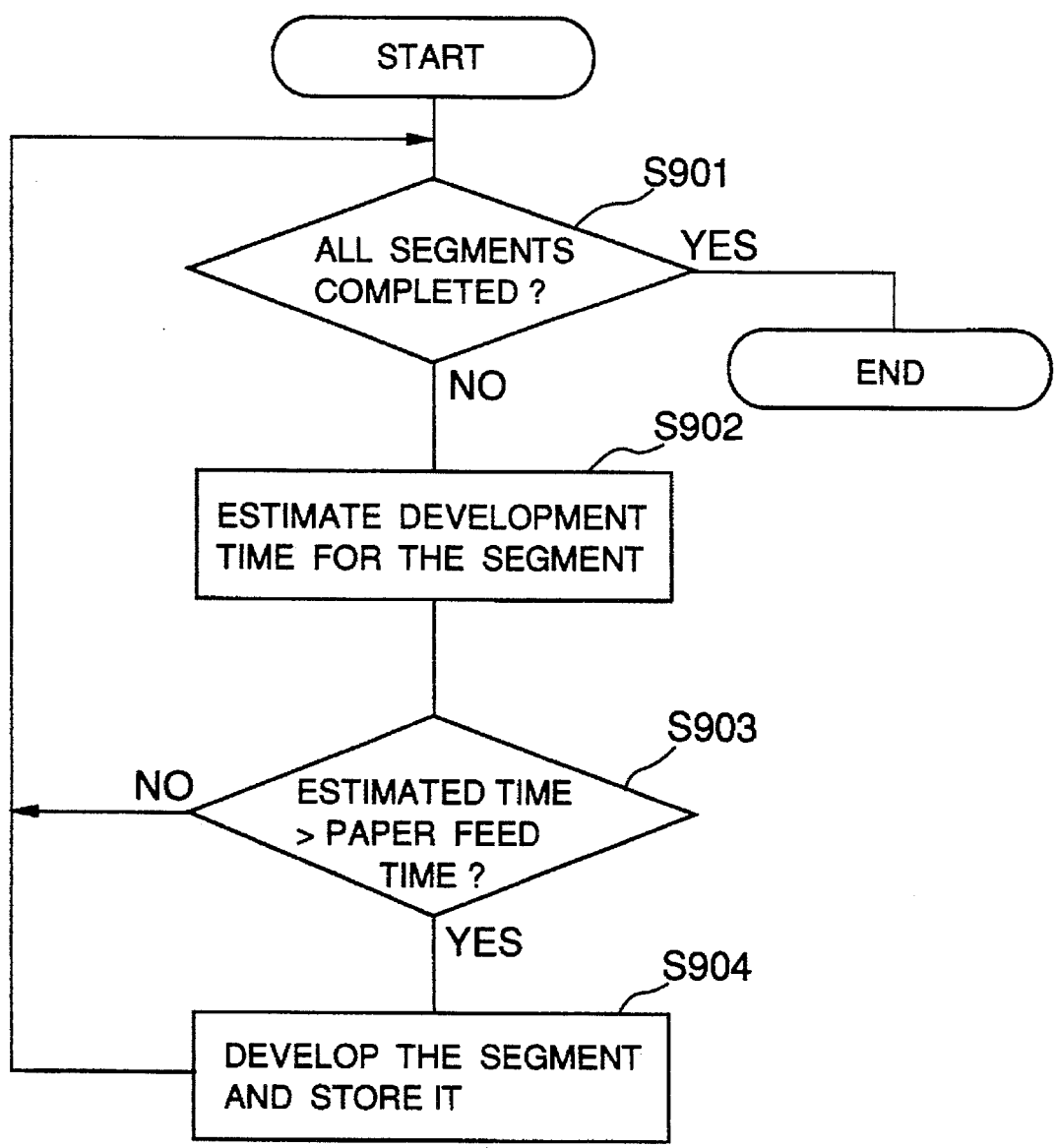
FIG. 9 is a flowchart showing the band control method according to the embodiment.

A check is first made to see if the processes of all of the segments of the relevant page have been finished or not (step S901 in FIG. 9). If YES, the processing routine is completed.

If NO in step S901, the developing time of the relevant segment is presumed (step S902).

In general, the developing time of the relevant segment is presumed in accordance with the number of print objects (character, figure, image data, etc.) included in the segment and the attributes (size of character, decoration attribute, shape and size of figure, etc.) of each print object. The developing time in the above case is presumed in the following manner. For instance, time information of each object has been stored in the program memory 402 in FIG. 4 or the like. The time information regarding the objects to be developed into each band are accumulated, thereby presuming. For instance, up to a character size of 100-point, a time factor is set to "1", and up to a circle of 20 cm, a time factor is set to "1", a time factor for the shadow is set to "2", a time factor for the painting is set to "2", and the like. Therefore, in the case where both of a character with a shadow having a character size is equal to 10-point and a circle (10 cm) are drawn, the total time factor is equal to 4 (1+2 +1). Now, assuming that a reference time factor in judgment in step S903 in FIG. 9 of the band width is set to 5, the above total time factor "4" is smaller than the reference time factor "5". Since the developing time of the information to be developed for such a band is short, it is proper to store the print code.

For example, in the case of drawing a character, a developing speed of the character is determined in accordance with the size of character and the designation of a character decoration. In the case of drawing a circle, a developing speed of the circle is decided in accordance with the size of circle and the thickness of the line.

As mentioned above, the sum of the developing speeds of all of the print objects included in the relevant segment results in a presumed time of the segment.

The paper feed speed in the printer is constant. Therefore, the feed speed of each segment (502 in FIG. 5) is set to a constant value. The presumed time of the relevant segment is compared with a time corresponding to the feed speed of each segment (502 in FIG. 5) (step S903 in FIG. 9). When the presumed time is equal to or smaller than the time corresponding to the feed speed, the stored print data of the relevant segment is held as it is (601 in FIG. 6) and the processing routine is returned to step S901 in FIG. 9 for the processes of the next segment.

Figure 6:
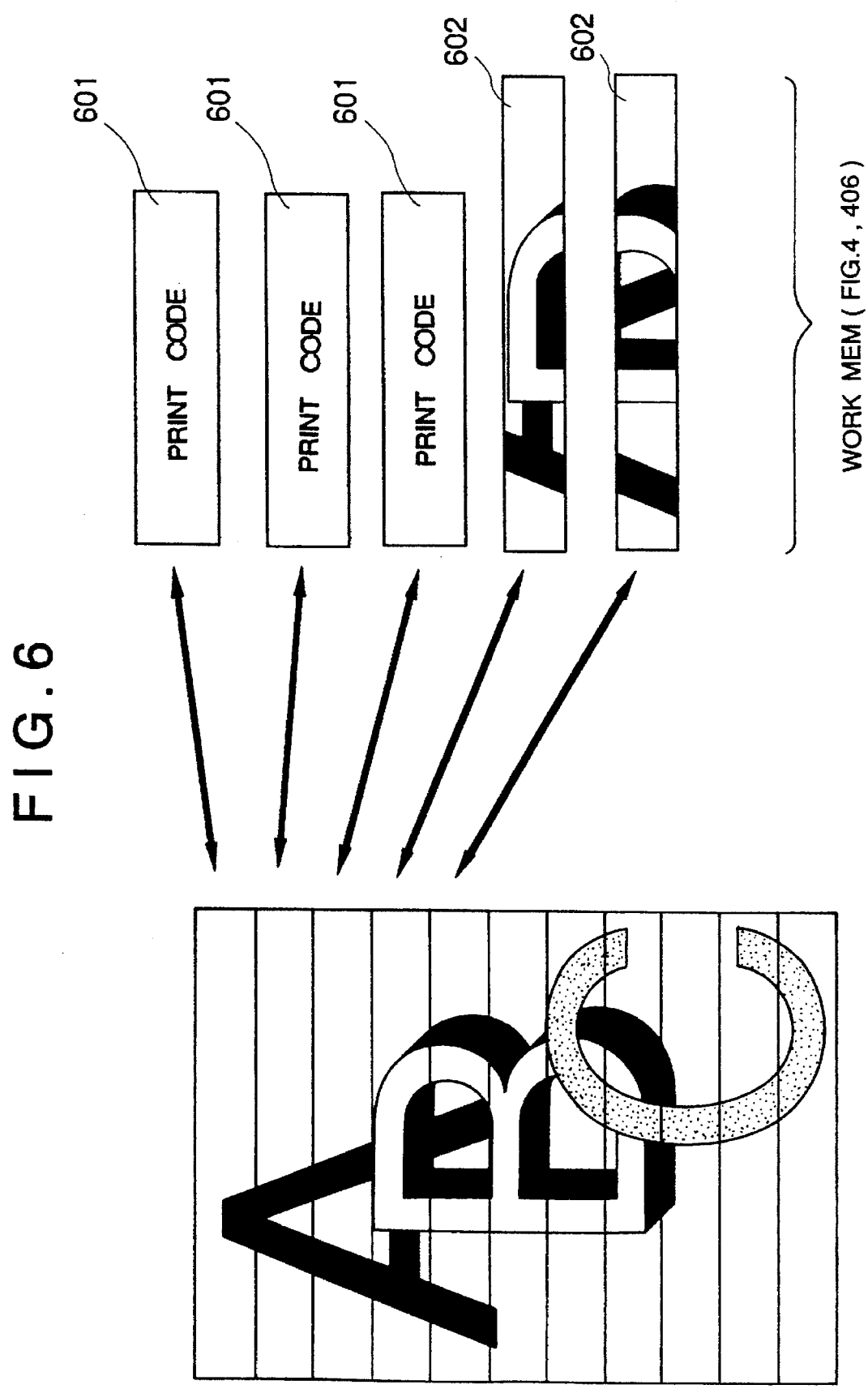
FIG. 6 is a diagram showing an example in the cases where the print data of each segment is stored as a print code and where it is stored as development data.

When the presumed time is larger, the print data of the segment is developed into a bit map image and stored as shown in step S602 in FIG. 6 (step S904 in FIG. 9). The processing routine is returned to step S901 in FIG. 9 for the processes of the next segment.

FIG. 6 shows an example of the result of the processes of the flowchart shown in FIG. 9. That is, reference numeral 601 in FIG. 6 shows a state in which the print data is stored as it is because the presumed speed of the print data of the segment is equal to or smaller than the paper feed speed. Reference numeral 602 shows a state in which the print data is developed into the bit map image and stored because the presumed speed of the print data of the segment is larger than the paper feed speed, that is, the developing process can be started in the case of actually printing one page.

The details of steps S804 in FIG. 8 will now be described in accordance with the flowchart of FIG. 10.

Figure 10:
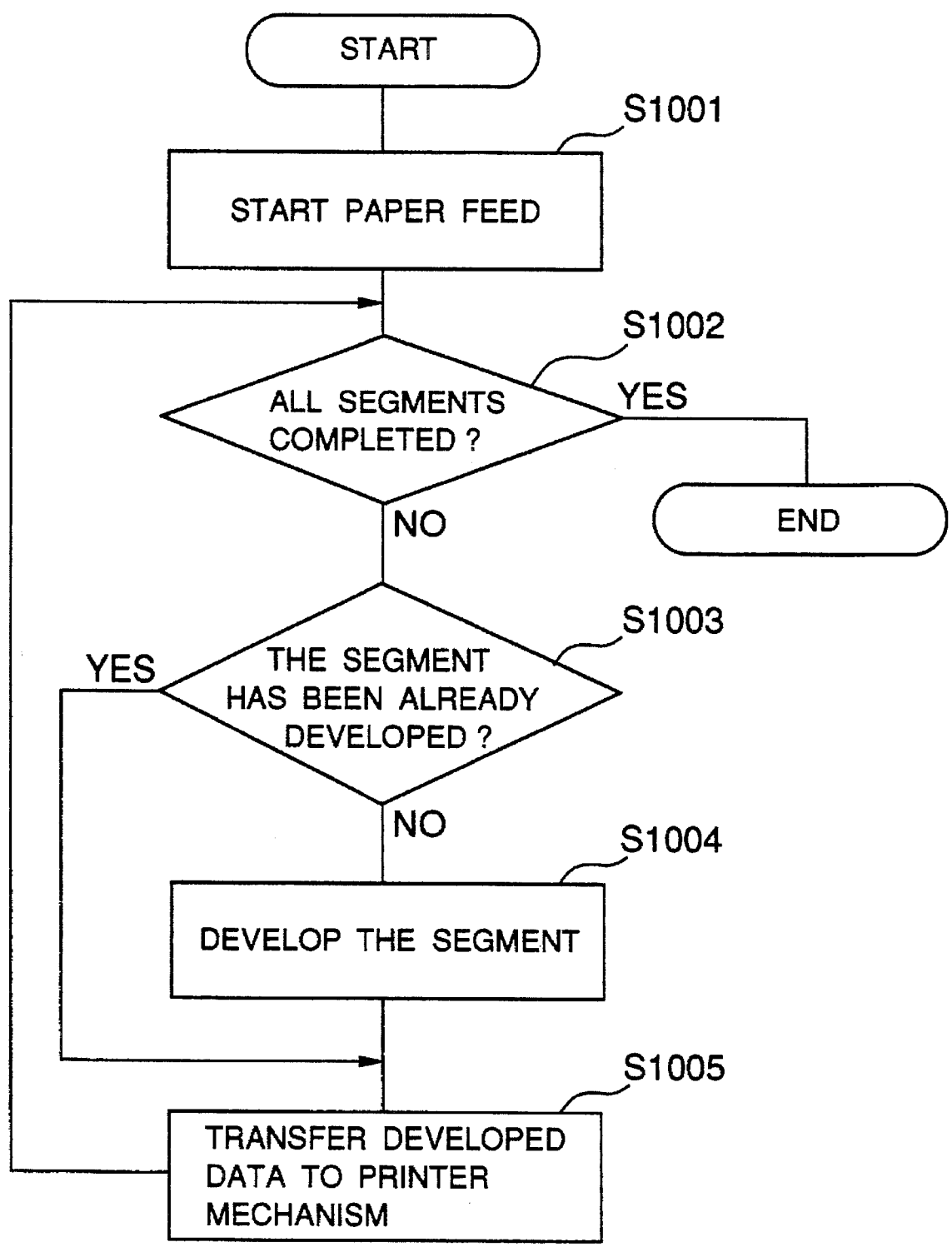
FIG. 10 is a flowchart showing the band control method according to the embodiment.

The paper feeding operation is first started to print the page (step S1001 in FIG. 10).

A check is now made to see if the processes for all of the segments of the relevant page have been finished or not (step S1002). If YES, the processing routine is completed.

If NO, a check is made to see if the segment has already been developed and stored or not (step S1003). If YES in step S1003, step S1005 follows. If NO in step S1003, the print data of the segment is developed (step S1004).

The development data (bit map image) of the segment is subsequently transferred to the printer engine (step S1005). The processing routine is returned to step S1001 for the processes of the next segment.

Figure 7:
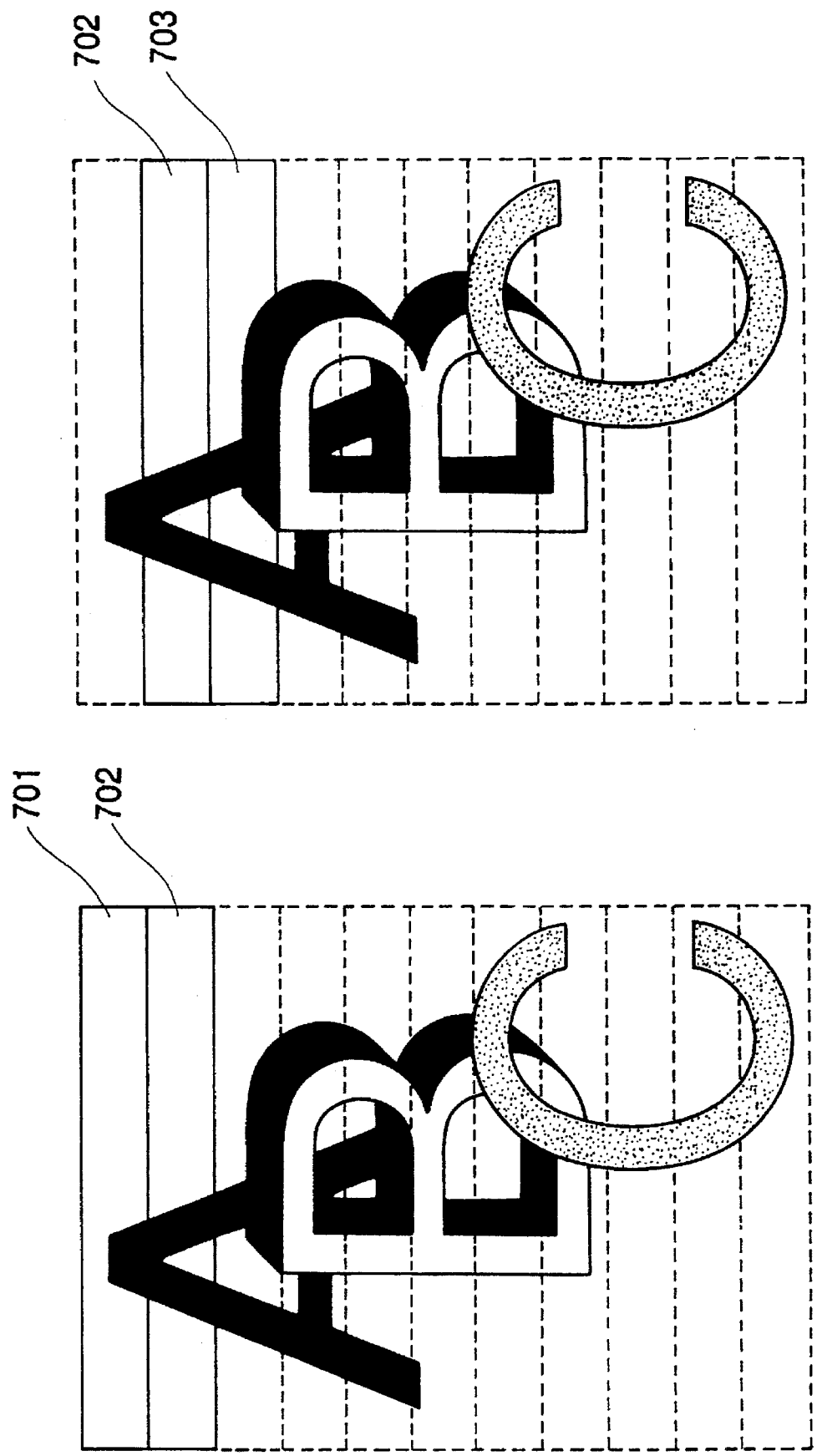
FIG. 7 is a diagram showing a band control method.

The contents of the actual operations are shown in FIG. 7.

First, the print data developing areas based on the segment unit are prepared in at least two work memories (701 and 702 in FIG. 7).

The print data of the head segment is developed into the print data developing area (701 in FIG. 7). In the case where the relevant segment has already been developed and stored, the development data storing area of the segment is regarded as 701 in FIG. 7.

In this state, the transfer of the bit map image 701 in FIG. 7 to the printer engine is started. Since the paper feed speed is constant, the transfer time of the bit map image to the printer engine is constant. By completing the development of the next segment within such a constant time (702 in FIG. 7), no overrun will occur.

According to the invention, since the segment such that the occurrence of the overrun is presumed has previously been developed and stored, the overrun actually never occurs in any cases.

The developing process (703 in FIG. 7) of the next segment is sequentially executed in a manner similar to the above. Since the print data developing area in which the bit map image has already been transferred to the printer engine can be again used, the areas 701 and 703 in FIG. 7 are actually the same area. (Another embodiment)

According to the invention, the presumed developing time of the segment and the paper feed time are compared and the segment is previously developed into the bit map image and stored as necessary, thereby preventing the overrun in the band control. However, if the print data of the page is complicated, the number of segments which should previously be developed and stored is large, so that the memory saving as an inherent purpose of the band control cannot be accomplished.

Figure 11:
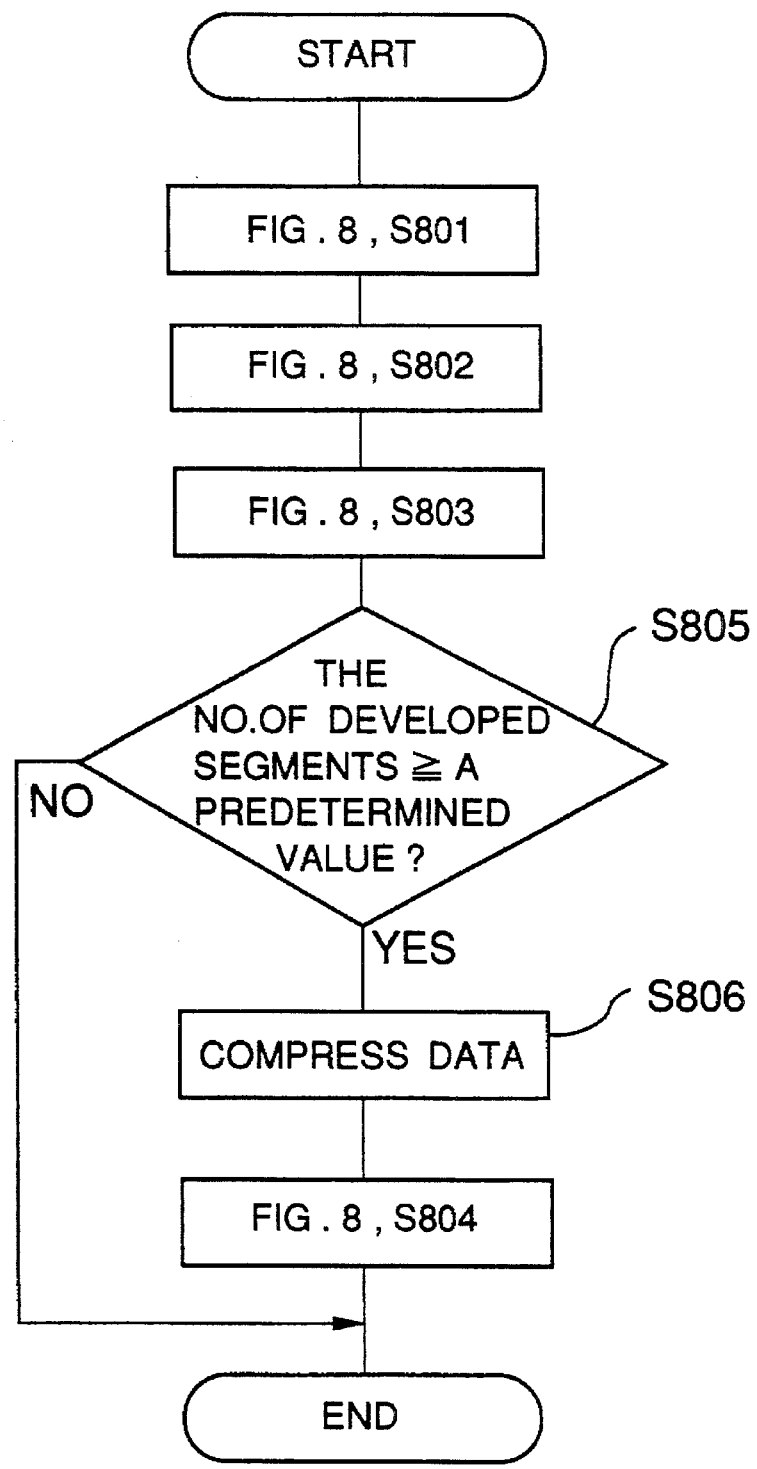
FIG. 11 is a flowchart in the case of judging whether the compression is executed or not.
Figure 12:
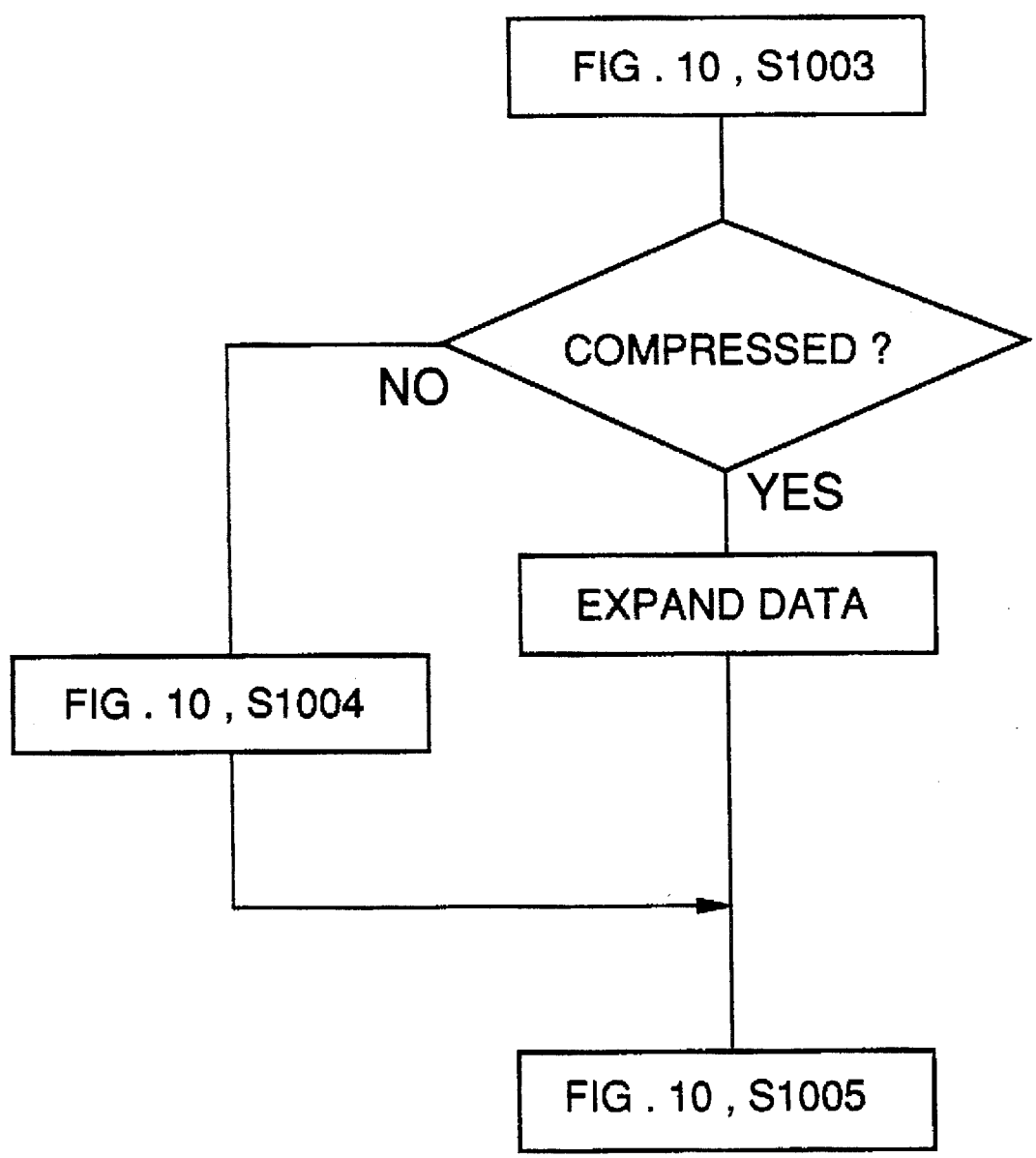
FIG. 12 is a flowchart showing an output process in the case of outputting.

Therefore, when the print data of the segment is developed and stored, by compressing the bit map image and storing, the memory saving can be realized. FIG. 11 is a flowchart in such a case. A processing routine of FIG. 11 is inserted between steps S803 and S804 in FIG. 8. That is, when the number of developed segments is equal to or larger than a predetermined value (for instance, 3 or more or a Value which is equal to or larger than the half of the A4 size, or the like), the answer in step S805 is YES, so that a compressing process is performed in step S806. The processing routine advances to step S804 in FIG. 8. As a compressing process, it is possible to use any one of the processes such as ADCT vector quantization, MH, MR, MMR, Huffman, run length, and the like. The flow of FIG. 10 becomes as shown in FIG. 12 in association with it.

It is a necessary condition of the invention that the compressed bit map image can be expanded within the feed time of one segment.

As described above, the presumed developing time of the segment is compared with the paper feed time and the relevant segment is previously developed into the bit map image and stored as necessary, so that the occurrence of the overrun in the band control can be prevented and the correct print result can be always derived. Although the invention has been described with respect to one page as a reference, the invention is not limited to such an example. A region larger or smaller than one page can be also used as a reference.

As described in detail above, it is possible to provide an output apparatus or an output method in which a time which is necessary to develop on a partial unit basis the output data corresponding to each portion among a plurality of partial regions constructing one page is presumed and a decision is made with respect to whether the output data of each portion should previously be developed and stored on the basis the time required to generate one page irrespective of the output data or not.

What is claimed is:

1. An output apparatus comprising:
   means for presuming a time required to convert code data corresponding to each of a plurality of partial regions constructing one page into bit map data;
   determining means for determining whether or not the code data of each region should previously be converted into bit map data and stored based on the presumed time obtained by said presuming means and based on an inherent printing speed of a printer engine;
   means for storing the bit map data of a region, which has been determined by the determining means to be a region which should previously be converted into bit map data, prior to printing; and
   transfer means for transferring bit map data by a partial region unit in sequence of one page to the printer engine upon printing one page, wherein, in the case the code data of a region is previously converted into bit map data and stored in said storing means, said transfer means transfers the stored bit map data to the printer engine and, in the case the code data of that region is not previously converted into bit map data, said transfer means converts that code data into bit map data and transfers the converted bit map data to the printer engine.

2. An output method comprising the steps of:
   presuming a time required to convert code data corresponding to each of a plurality of partial regions constructing one page into bit map data;
   determining whether or not the code data of each region should previously be converted into bit map data and stored based on the presumed time and based on an inherent printing speed of a printer engine for printing the bit map data;
   storing, the bit map data of a region, which has been determined in the determining step to be an area which should previously be converted into bit map data, prior to printing; and
   transferring bit map data by a partial region unit in sequence of one page to the printer engine upon printing one page, wherein, in the case the code data of a region is previously converted into bit map data and stored in said storing step, the stored bit map data is transferred in the transfer step to the printer engine and, in the case the code data of that region is not previously converted into bit map data, the code data is converted into bit map data and the converted bit map data is transferred to the printer engine in the transfer step.

3. An apparatus according to claim 1, wherein said determining means executes a determination based on the size of a pattern included in the code data of the each region, the type of a line forming the pattern, the type of modification applied to the pattern, or the number of such patterns.

4. An apparatus according to claim 1, further comprising means for compressing the bit map data before they are stored in said storage means.

5. A method according to claim 2, wherein a determination is executed in said determining step based on the size of a pattern included in the code data of the each region, the type of a line forming the pattern, the type of modification applied to the pattern, or the number of such patterns.

6. A method according to claim 2, further comprising the step of compressing the bit map data before they are stored.

7. An output apparatus which applies a generation process to first information input from an information processing apparatus in order to generate second information therefrom and which outputs the generated second information, said output apparatus comprising:
   dividing means for dividing the first information input from the information processing apparatus into a plurality of segments;
   discriminating means for discriminating between a first group of the plurality of segments to which the generation process can be applied within a prescribed time, and a second group of the plurality of segments to which the generation process cannot be applied within the prescribed time; and
   control means for controlling said output apparatus to store in a memory the input first information for the first group without applying the generation process, and for controlling said output apparatus to apply the generation process to the input first information for the second group so as to generate the second information and to store the generated second information in the memory.

8. An output apparatus according to claim 7, wherein the first information comprises character code.

9. An output apparatus according to claim 7, wherein the generation process comprises conversion of the input first information into the second information.

10. An output apparatus according to claim 7, wherein the second information comprises bit map image information.

11. An output apparatus according to claim 7, wherein the prescribed time is a paper feed time in a printer.

12. An output apparatus according to claim 7, wherein said discriminating means discriminates the first group by determining whether, for each segment, the generation process can be applied and the second information generated therefrom can be stored in a band memory with the same size as the segment, all within the prescribed time.

13. An output method carried out in an output apparatus which applies a generation process to first information input from an information processing apparatus in order to generate second information therefrom and which outputs the generated second information, said output method comprising the steps of:
   dividing the first information input from the information processing apparatus into a plurality of segments;
   discriminating between a first group of the plurality of segments to which the generation process can be applied within a prescribed time, and a second group of the plurality of segments to which the generation process cannot be applied within the prescribed time; and
   controlling the output apparatus to store in a memory the input first information in the first group without applying the generation process, and for controlling the output apparatus to apply the generation process to the input first information for the second group so as to generate the second information and to store the generated second information in the memory.

14. An output method according to claim 13, wherein the first information comprises character code.

15. An output method according to claim 13, wherein the generation process comprises conversion of the input first information into the second information.

16. An output method according to claim 13, wherein the second information comprises bit map image information.

17. An output method according to claim 13, wherein the prescribed time is a paper feed time in a printer.

18. An output method according to claim 13, wherein said discriminating step discriminates the first group of the segments by determining whether, for each segment, the generation process can be applied and the second information generated therefrom can be stored in a band memory with the same size as the segment, all within the prescribed time.

19. An output control apparatus which divides one page of code data into segments and controls data output for each segment, said apparatus comprising:

determining means for determining, based on a time required to convert pattern data into image data segment-by-segment and a time predetermined based on an output speed of a printer used in conjunction with said apparatus whether the image data can be drawn in a memory in the predetermined time; and control means for controlling image data drawing such that the image data is drawn in the memory in advance based on the pattern data for one segment, if said determining means determines that the image data for the one segment cannot be drawn in the predetermined time.

20. An apparatus according to claim 19, wherein the pattern data comprises code data.

21. An apparatus according to claim 19, wherein the image data is drawn in the memory as bit map data.

22. An apparatus according to claim 19, wherein the predetermined time is a paper feed time of the printer.

23. An apparatus according to claim 19, further comprising compressing means for compressing the image data drawn in the memory.

24. An apparatus according to claim 23, further comprising expansion means for expanding the image data compressed by said compressing means.

25. An apparatus according to claim 19, further comprising printing means for printing the image data drawn in the memory, wherein said printing means comprises the printer.

26. A drawing method which divides one page of code data into segments and controls data output of each segment, comprising the steps of:

a determining step for determining, based on a time required to convert pattern data into image data segment-by-segment and a time predetermined based on an output speed of a printer used in conjunction with said method, whether the image data can be drawn in a memory in the predetermined time; and a controlling step for controlling image data drawing such that the image data is drawn in the memory in advance based on the pattern data for one segment, if said determining step determines that the image data cannot be drawn in the predetermined time.

27. A method according to claim 26, wherein the pattern data comprises code data.

28. A method according to claim 26, wherein the image data is drawn in the memory as bit map data.

29. A method according to claim 26, further comprising the step of printing the image data drawn in the memory onto paper, wherein the predetermined time is a paper feed time in said printing step.

30. A method according to claim 26, further comprising the step of compressing the image data drawn in said memory.

31. A method according to claim 30, further comprising the step of expanding the compressed image data.

32. A method according to claim 26, further comprising the step of printing the image data drawn in the memory on a printer.

33. An apparatus according to claim 19, wherein said control means controls image data drawing such that the pattern data for one segment is stored in the memory, if said determining means determines that the image data for the one segment can be drawn in the predetermined time.

34. An apparatus according to claim 19, wherein the predetermined time is determined based on the output speed of the printer and the number of the segments.

35. A method according to claim 26, wherein said controlling step controls image data drawing such that the pattern data for one segment is stored in the memory, if said determining step determines that the image data for the one segment can be drawn in the predetermined time.

36. A method according to claim 26, wherein the predetermined time is determined based on the output speed of the printer and the number of the segments.

* * * * *